United States Patent [19]

Christopher et al.

[11] Patent Number: 4,516,266

[45] Date of Patent: May 7, 1985

[54] ENTITY CONTROL FOR RASTER DISPLAYS

[75] Inventors: Robert J. Christopher, Underhill; Robert F. Walker, Hinesburg, both of Vt.

[73] Assignee: International Business Machines Corporation, Armonk, N.Y.

[21] Appl. No.: 450,577

[22] Filed: Dec. 17, 1982

[51] Int. Cl.³ ............................ G06F 3/14; G06K 9/00
[52] U.S. Cl. ...................................... 382/48; 340/701; 340/706; 340/799; 382/16; 382/59; 382/61
[58] Field of Search ............... 382/16, 19, 61, 48, 382/51, 34; 340/715, 702–704, 706–710, 798–801, 701, 729; 364/518, 521; 358/138, 139, 183, 10, 93, 107

[56] References Cited

U.S. PATENT DOCUMENTS

| | | | |
|---|---|---|---|
| 3,728,710 | 4/1973 | Berg | 340/324 A |
| 3,801,741 | 4/1974 | Ablett | 340/707 |
| 3,906,197 | 9/1975 | Grover | 235/151 |
| 4,138,662 | 2/1979 | Shimoyama | 382/61 |
| 4,181,952 | 1/1980 | Casey et al. | 340/709 |
| 4,189,744 | 2/1980 | Stern | 358/93 |
| 4,224,614 | 9/1980 | DevChoudhury | 340/707 |
| 4,454,593 | 6/1984 | Fleming et al. | 340/703 |

Primary Examiner—Leo H. Boudreau
Attorney, Agent, or Firm—Francis J. Thornton

[57] ABSTRACT

An apparatus for carrying out, at frame rates, entity detection and verification on bit-mapped raster graphic systems by providing an entity identification bit sequence with each feature of the picture displayed. The apparatus includes a display coupled to a store for input data, serially sending items of data to the display, together with means for identifying the items of data so supplied, such that all the items of data forming a selected feature, i.e., line, circle, background or etc. of the display can be identified, and stored. Comparison and register means are used to drive a modulating means to verify the display of the items of data, forming the selected feature, when a correlation occurs between the selected feature and the feature formed by the items of data sent from the store. Verification may be emphasizing, i.e., brightening, flashing, color change, etc. the feature selected.

8 Claims, 2 Drawing Figures

ENTITY CONTROL FOR RASTER DISPLAYS

BACKGROUND OF THE INVENTION

The present invention relates to apparatus and methods for carrying out entity detection and verification in a raster system including a store for data. More particularly it provides for entity detection and verification in bit mapped raster graphic systems.

Various systems for enhancing the presentations of selected displays have been suggested. In such systems encoded information is fed into a storage memory where it's stored. When needed the encoded information is selectively read out of the memory, decoded and used to control the beam of a cathode ray or video display tube to form an image such as a line or a circle or the like on the face of the tube.

Basically there are two types of video display tubes. One tube employs a vector display arrangement and the other employs a raster display. In the vector display, the electron gun constantly emits a beam which is then caused to trace the displayed image. In the raster scan system the beam is modulated in intensity while the screen is scanned, i.e., the beam position is deflected in a definite regular pattern across the face of the tube so that in effect an array of spots of varying intensity or colors are used to form the image. Each full pattern covering the entire display is known as a frame.

In vector display systems entity detection is dependent on the image being serially regenerated from a memory. The methods for performing entity identification and verification are well known to the art and are not described herein.

In raster display systems entity detection has also been accomplished by a regenerating image memory, however, such a system requires very fast and expensive rasterization equipment and limits the graphics order buffer size.

Each feature of an image on a raster display is formed of a string of picture elements or pixels. Each pixel displayed has a particular address and is formed by one or more bits stored in a memory. The bits are used to form each pixel by controlling the intensity and/or color of the beam used to form the pixel.

In a typical prior art three electron gun color raster system, the bits used to form each pixel are used in one of two ways. In the first way, the bits are subdivided into three groups, each group controlling directly one of the electron guns in the CRT. In the second way the bits are used as an index in a "color look-up table." In this case, each entry in the look-up table contains the sets of bits used to control the electron guns in the CRT.

In both types of prior art color raster systems, once the image memory is defined, there is no way of knowing whether a particular pixel is associated with any particular feature of the image being displayed (i.e., whether a pixel is part of the image background, or part of a particular line, etc.) without regenerating image memory.

Accordingly, the present invention is designed to overcome the difficulties encountered in the prior art apparatus and permits entity detection and entity verification, i.e., emphasizing the detected entity, in real time without requiring image memory regeneration, fast or expensive rasterization equipment and without graphic order size limitations.

FEATURES OF THE INVENTION

The present invention is particularly directed toward entity detection and verification to be done at frame rates in bit mapped raster graphic systems. By associating additional bits, i.e., entity identification bits, with each pixel in an image, each pixel can be identified with respect to a particular feature of the image displayed, i.e., the pixel is used in one side of a rectangle, a vertical line, or part of the image background, or the like, such that whenever a particular feature is selected in the display, for example, by touching an individual pixel with a light pen, or the like, the entire feature, of which that pixel is but one segment, can be verified, e.g. emphasized, and so brought selectively to the observers attention by flashing, color change, brightness change or the like. Such verification provides a significant human factor advantage in utilizing such visual displays and aids in the providing of efficient, accurate man to machine communication.

The apparatus can be adapted so that either highlighting of the selected feature will stop as soon as the user stops selection of the feature or the highlighting will continue until a different feature is selected.

By completely decoupling the image generation from the entity detection apparatus, entity detection and verification can be accomplished at video frame rates regardless of the size or complexity of the image. This means that the same display apparatus can be used for many more applications than the prior art. For example, image processing applications require large amounts of CPU time to perform image generation. With prior art systems entity detection and verification were not possible. The system will provide video frame rate entity detection and verification with these applications.

The system is substantially faster than those known to the prior art since feature detection and verification are performed at the same speed that the display is refreshed.

SUMMARY OF THE INVENTION

Accordingly, the present invention utilizes apparatus for carrying out displayed feature detection and verification in a raster system including a store for data, display means for serially receiving items of data from the store, and forming an image therefrom, each item of data being provided with an identifying signal, which signal is associated with the feature formed in part by said item, input means for generating signals representing the coordinates of selected points in a multi-dimensional region, comparison means for comparing the signal representing the coordinates of the selected points with the incoming items of data to indicate if a correlation exists, and providing an output signal if said correlation exists, register means for storing the output signal of said comparison means, second comparison means for comparing the stored output signal with the serially received items of data from said store, and means coupled to the second comparison means, for emphasizing those portions of the display correlated with the derived coordinates, said second comparison means providing said emphasizing means with a signal to cause said emphasizing means to emphasize the serially received items of data from the store when a comparison occurs between the stored signal and the incoming items of data.

Thus in a color raster system each pixel must have associated with it at least four groups of bits, 3 of the groups would be used, as in the prior art, to control the electron beams in the CRT and the fourth group, i.e., the entity identification bit sequence, will identify the feature of the display of which that pixel forms a part.

BRIEF DESCRIPTION OF THE DRAWINGS

A better understanding of the invention will be had by reference to the following description taken in conjunction with the accompanying drawings in which.

DESCRIPTION OF THE PREFERRED EMBODIMENT

Figure 1:
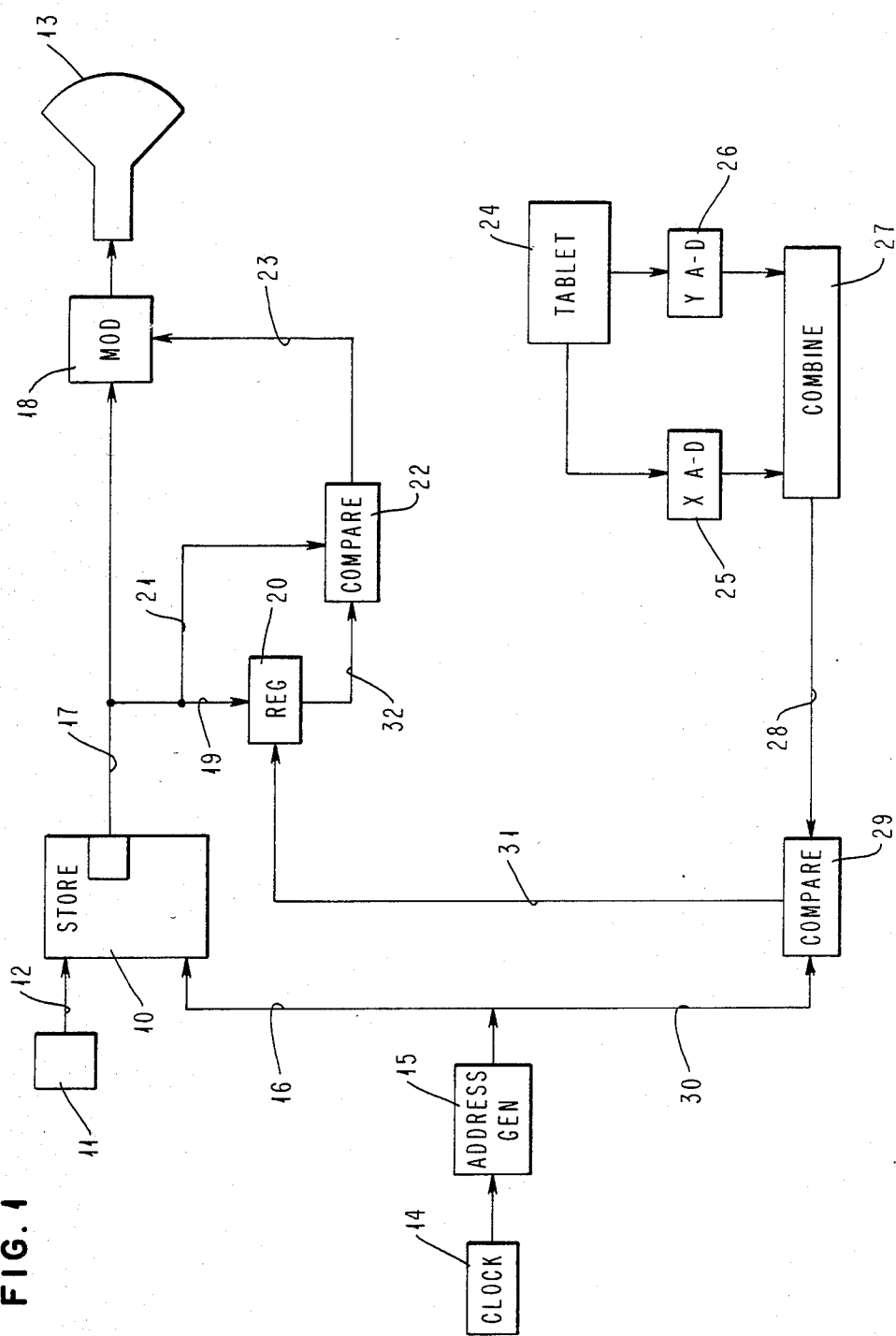
FIG. 1 is a block diagram of an apparatus in accordance with the present invention.

FIG. 1 illustrates a block diagram for the system of the present invention. The invention can be thought of as being in two parts: a means of performing entity or feature detection, and a means of performing verification of the detected feature.

(A) Such entity or feature detection in a raster system requires two things:
 (1) A means of associating each pixel with a feature of the image;
 (2) A means of "pointing at", or selecting, a particular pixel in the image; while verification of the detected feature requires a means of determining whether or not a particular feature has been detected.

The present invention is expecially directed towards associating each pixel with a particular feature of the image. In the present invention this is accomplished by providing each pixel with additional identification bits beyond those necessary to control the electron guns in the display tube.

Thus, in the present invention, additional identification bits are associated with each pixel in image memory. These additional bits are an identification sequence which is set when the image is written to the image memory. The identification sequence is used to associate each pixel with a particular feature of the image for example, this pixel is part of this rectangle, or this pixel is part of that vertical line, or this pixel is part of image background, etc.

The bits necessary for creating a complete image display are entered into a store 10 from a computer 11 via channel 12.

Each string of bits handled by the store 10 is used to create and identify a pixel and consists of a video signal sequence, in digital form, which includes a sequence of digital valued signals for color formation, anc an identification sequence, associating the pixel to a particular element in the display. For ease of reference, each such combined video signal sequence and identification sequence will be hereinafter collectively referred to as an item of data.

Thus each such item of data will control the intensity and color of a respective fixed position on the cathode ray tube display and identify a particular feature of the displayed image.

These data items can be immediately processed to display an image on a cathode ray tube 13. Alternately, these items of data can be held in the store in the form of instructions which can cause the image to appear on the cathode ray tube 13 continuously. Thus, the desired information for forming the image on the cathode ray tube 13 can continuously be cycled through the store to allow the display to be refreshed. Such continuous cycling techniques, in the store, are well known to the art and are not described herein.

Each item of data is selected from the loaded store 10 by a clock 14 driven address generator 15 coupled to the store 10 via line 16. This generator 15 provides an address i.e., the x and y coordinates of any pixel, in the form of a digital word that cause the store to select the item of data that will create the pixel of that location. The selected item of data is transfered out of the store 10 via line 17 and passes through a normally inactive modulator circuit 18, to the cathode ray tube 13. Simultaneously the item of data is also sent via line 19 to a register 20 and via line 21 to a standard comparator 22. This comparator 22 is coupled via line 23 to the modulator 18 so that a selected element in the display can be emphasized as will be further described below.

A man-machine interaction means 24 is provided. This man-machine interaction means 24 may be any means, such as an input tablet, a track ball, a joy stick, control dials or a light pen, that is capable of indicating and providing to the apparatus appropriate signals that will define the x-y coordinates of a selected pixel. Such devices and their operation are generally well known and are described in the literature.

For purposes of illustration only, it will be assumed, in the present example that the interaction means 24 is a CRT graphical input tablet that operates as follows.

When the user holds the stylus at a coordinate point on the tablet, a cursor indicating the respective position of the stylus on the tablet is displayed on the screen of the CRT 13. Thus, the cursor visually identifies a predetermined correlation between the tablet and the display screen 12. This cursor can, for example, take the form of crossed lines meeting at the point being indicated. Thus, the indication of particular pixel in the display is carried with each frame, the movement of the stylus causes an identical movement of the cursor and the movement of the cursor occurs in real time. Simultaneously the tablet provides an address signal of the selected pixel indicated by the cursor.

This tablet 24 is connected to analog to digital converters 25 and 26 which convert the received address signal into x and y coordinates, of the position of the selected pixel indicated on the display tube by the cursor. Converter 25 supplies the x coordinates while converter 26 supplies the y coordinates.

Because the stylus position on the tablet corresponds to the position of the one particular pixel which forms an element in the display, emphasis of the indicated feature will occur only when all of the pixels forming the selected element of the display carries an identical entity or feature identification sequence.

The signals from the converters 25 and 26 are combined in a combining circuit 27 to form a digital word which is the address of the selected pixel. This address is in the same form as that provided by the address generator 15. The address of the selected pixel is now passed, via line 28 from the circuit 27, to a second comparator circuit 29.

When the address generator 15 sends an address signal to the store 10 it simultaneously feeds this address signal to the second comparator 29 via line 30. When the address signals from the combine circuit 27 are identical with the address signals put out by the address generator 15, the comparator circuit 29 sends a loading signal to the register 20. This loading signal identifies to the register 20 which pixel has been selected at the tablet and causes the register to become loaded with the identification number of the selected pixel.

When the register 20 becomes loaded it permits all items of data containing the same entity identification sequence as the selected pixel to pass through the register 20 and presents this entity identification sequence through line 32 to the comparator circuit 22. When the comparator circuit 22 receives items of data on both input lines 21 and 32, which items of data carry identical identification sequences, the comparator circuit emits an activation signal which is transmitted to and activates the modulation circuit 18. Since each pixel in the feature being selected carries the identical identification sequence all the pixels having that identification number and hence the feature formed by these pixels become modulated.

This modulation circuit will cause the feature on the display of which the selected pixel is part to be verified by emphasization. For example, each pixel making up the feature to be altered in brightness, changed in color, caused to flash intermittently, or the like. Such modulation circuits are presently well known and need not be further described here.

In this way a pixel can be selected and the feature of the image display of which that pixel is a portion can be detected and verified.

If the selected pixel forms a portion of more than one element, for example, if the selected pixel is selected at the intersection of elements on the display usually only one of the elements will be identified by the identification number of the selected pixel. Thus, it may be necessary to move off the selected pixel onto another adjacent pixel to emphasize the other element. Of course it is possible to vary the invention so that at the choice of the operator, either a part of an element or the whole element or could be highlighted. For example, let it be assumed the entity consists of a rectangle having four sides and that the entire rectangle has one identity number with each of the four sides sharing a part of that identity number instead of being separately identifiable. In this case, at the choice of the operator, and the appropriate setting of register 20 any one side could be emphasized or alternately, the entire rectangle could be so emphasized. Once the identity number of the selected pixel is latched into the register 20 it will be retained there for the remainder of the frame being processed at the time of selection plus at least one subsequent complete frame.

Figure 2:
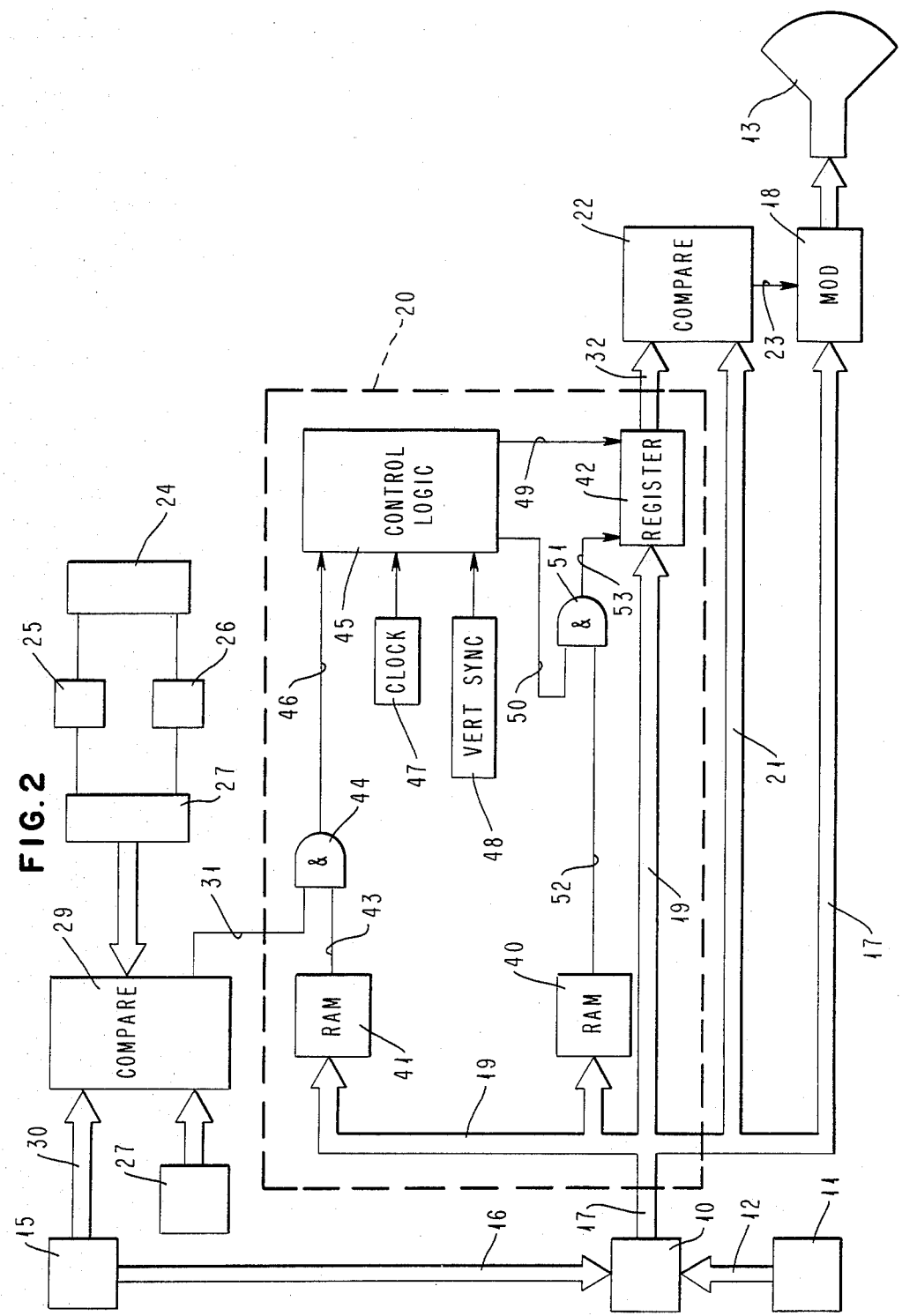
FIG. 2 is a more detailed diagram of the register of FIG. 1.

Turning now to FIG. 2, the character of register 20 will be discussed in more detail.

Once again the store 10 is loaded from computer 11 with the necessary items of data and this store is controlled by the address generator 15 via line 16. This generator also feeds address information via line 30 to the compare circuit 29 where it is compared with information from the combine circuit 27. When a comparison is made a loading signal is sent to the register 20 via line 31.

Again, the items of data from store 10 are simultaneously fed, via line 17, to the register 20, and the modulator circuit 18; and, via line 21, to the comparator circuit 22. These items of data entering the register 20 are simultaneously sent to a pair of identical random access memories (RAM) 40 and 41 and to a register 42 via line 19. The memory 41 contains the entity detectability status and provides an output via line 43 to an AND gate 44 into which the output of the comparator circuit 29 is also fed, via line 31. When a signal is present on both lines 31 and 44 this AND gate 44 is active and an output, i.e. a detect signal is impressed on the control logic circuit 45 via line 46.

Also fed into this control logic element 45, is a continuous clock signal from a clock 47, and a vertical synchronization pulse from a vertical synchronizer 48.

If desired only a single clock need be provided for the entire system. Thus, this clock 47 need not be a separate clock but can be a portion of clock 14.

Also, since cathode ray systems are provided with a vertical synchronization signal at the end of each frame a separate sync circuit 48 need not be used. The imposition of the detect signal from the AND gate 44 on line 46 causes the control logic 45 to emit a SET signal via line 49 to an identification register 42. This SET signal, sent to register 42, via line 49 causes the register 42 to latch the identity bits of the selected item of data. The contents of register 42 thus become the identification sequence of the selected pixel and are presented to the comparator 22 via line 32, where they are compared to the current item of data on line 21. When comparable, an activation signal is emitted via line 23 to the modulator circuit 18 which then becomes activated to cause the selected elements of the display to become emphasized.

The imposition of the signal from the vertical synchronizer 48 causes the control logic 45 to send a RESET CLOCK PULSE via line 50 to AND circuit 51. This AND circuit 51 is also supplied with a verification mode signal from the RAM 40 via line 52.

In this case the RAM 40 is loaded with information that will control persistence of the verified entity displayed on the face of the cathode ray tube. This can be accomplished by loading the memory such that a signal will not be sent to the AND circuit 51 from the RAM 40 for a predetermined amount of time.

The unit could also be designed such that RAM 40 could be eliminated. In such a case, line 43 could be also connected to the AND circuit 51 as well as to the AND circuit 44. In this case however a counter, either decrementing or incrementing, would have to be interposed between the vertical synchronizer circuit and the control logic circuit to assure that the verified signal would be maintained for the period of time, i.e. a specified number of frames, established by the counter.

In one form the control logic circuit could comprise a J-K flip-flop two NAND circuits, an inverter and an AND circuit.

In such an arrangement the line 46 would be coupled to the clock input of the J-K flip-flop, the K output would be grounded, the J output coupled to an input of the AND circuit and an input of a first one of the NAND circuits.

The line 46 would also be connected to the other input of the AND circuit so that with an output from the J output and a signal from the line 46 the AND circuit whose output is line 49 would provide a latching signal to the register 42.

The clock 47 is connected to an input of the second NAND circuit and through the inverter to an input of the first NAND circuit. The vertical synchronizer circuit 48 is connected to the other input of the second NAND circuit and to still another input of the first NAND circuit. The output of the second NAND circuit is connected to the J-K flip-flop and acts as a clear signal to the J-K flip-flop when both a clock and vertical synchronizer signal is present to clear and reset the flip-flop.

When the first NAND circuit has both an inverted clock and a vertical synchronizer signal present on its input and no output from the flip-flop the first NAND is activated and a clear or reset signal appears on line 50. In any event, with a coincidence of signals on line 50 and 52, the AND circuit 51 is activated, emitting a RESET LATCH signal on line 53 into latch 42. This latch 42 is n w caused to be reset. Consequently comparator 22 shuts off and its output on line 23 is shut off causing the modulator 18 to be deactivated such that emphasization of the display ceases.

It should be obvious to one skilled in the art that the circuits can readily be modified, for example the RAM's 40 and 41 can be eliminated in which case all entities would be detectable and the verification would be restricted to a single mode.

Also, the RAM 40 could be loaded so that verification will persist for a fixed period of time or a fixed number of frames after detection steps. Alternately, the RAM 40 could be loaded so that the verification could be latched and would remain so until another entity is detected.

While the invention has been particularly shown and described with reference to a preferred embodiment thereof, it will be understood by those skilled in the art that various changes in form and details may be made therein without departing from the spirit and scope of the invention.

What is claimed is:

1. Apparatus for carrying out displayed feature detection and verification in a raster system including,
    a store for items of data,
    display means for serially receiving incoming items of data from said store, and forming an image therefrom,
    each item of data being used to form a part of a feature of the image and being provided with an identifying signal associated with the feature formed in part by said item,
    input means for generating signals, each representing the coordinates of a selected point in the feature formed in part by said item,
    first comparison means for comparing the signal representing the coordinates of the selected point with the incoming items of data from the store to indicate if a correlation exists, and providing a loading signal if such correlation exists,
    register means for receiving the loading signal of said first comparison means, and in response to the loading signal storing the identifying signal of the item of data so compared,
    second comparison means for comparing the stored identifying signal with the identifying signal of the serially received items of data from said store, and
    means coupled to the second comparison means, for emphasizing the feaure of the image correlated with the selected point,
    said second comparison means providing a signal to said emphasizing means for emphasizing the feature when a correlation occurs between the stored identifying signal and the identifying signal of the received items of data from the store.

2. The apparatus of claim 1 wherein said register means includes;
    means for detecting and verifying items of data from said store,
    means for latching the identifying signal from each item of data received from said store so long as a loading signal is received from said first comparison means, and
    means for resetting said means for latching the identifying signal when the loading signal is no longer received from the first comparison means.

3. The apparatus of claim 2 wherein said input means includes a graphical input device.

4. The apparatus of claim 3 wherein said display means includes a cathode ray tube, and
    refresh means are provided for causing the store to pass items of data for a display repeatedly.

5. The apparatus of claim 2 wherein said display means includes a cathode ray tube and said input means comprises means for indicating selected points on said tube including a continuously refreshed cursor and means forming said cursor.

6. The apparatus of claim 2 wherein the means for emphasizing portions of the display does so by changing the color of the emphasized portion in relation to the rest of the display.

7. The apparatus of claim 2 wherein the means for emphasizing portions of the display does so by changing the brightness of the emphasized portion in relation to the rest of the display.

8. The apparatus of claim 1 wherein said register means comprises;
    first and second random access memory means having inputs coupled to said data store and having respective outputs,
    first and second AND circuits, each having respective first and second inputs,
    a register latch,
    a clock, and
    a control logic circuit driven by said clock,
    said first memory means containing the entity detectability status of the input data from said store and having its output coupled to the first input of said first AND circuit,
    said first AND circuit having its second input coupled to said first comparison means and its output coupled to said clock driven control logic circuit,
    said control logic circuit being further coupled to a vertical synchronization circuit and to a register latch and to a second AND circuit,
    said control logic circuit providing a set signal to said register latch to latch the identifying signal of the selected item of data upon coincidence of signals from said clock and said first AND circuit,
    said control logic circuit providing a reset signal to the first input of said second AND circuit upon receipt of a signal from said vertical synchronizer circuit,
    said second memory means containing a verification mode of the input data from said store and having its output coupled to the second input of said second AND circuit,
    said second AND circuit passing a reset signal to said register latch to unlatch said latched identity bit upon coincidence of said reset signal from said control logic circuit on a verification mode output from said second memory means.

* * * * *